US010834416B2

(12) United States Patent
Ikonin et al.

(10) Patent No.: US 10,834,416 B2
(45) Date of Patent: Nov. 10, 2020

(54) APPARATUS AND METHOD FOR VIDEO MOTION COMPENSATION

(71) Applicant: Huawei Technologies Co., Ltd., Shenzhen (CN)

(72) Inventors: Sergey Yurievich Ikonin, Moscow (RU); Maxim Borisovitch Sychev, Moscow (RU); Victor Alexeevich Stepin, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

(21) Appl. No.: 15/934,043

(22) Filed: Mar. 23, 2018

(65) Prior Publication Data
US 2018/0213250 A1    Jul. 26, 2018

Related U.S. Application Data

(63) Continuation of application No. PCT/RU2015/000611, filed on Sep. 25, 2015.

(51) Int. Cl.
*H04N 19/51*    (2014.01)
*H04N 19/11*    (2014.01)
(Continued)

(52) U.S. Cl.
CPC ............ *H04N 19/51* (2014.11); *G06T 5/003* (2013.01); *H04N 19/117* (2014.11);
(Continued)

(58) Field of Classification Search
CPC ............................ H04N 19/51; H04N 19/117
(Continued)

(56) References Cited

U.S. PATENT DOCUMENTS 6,175,656 B1    1/2001 Hoang
7,266,150 B2    9/2007 Demos
(Continued)

FOREIGN PATENT DOCUMENTS

CN    1663258 A    8/2005
CN    103238320 A    8/2013
(Continued)

OTHER PUBLICATIONS

Yoon et al., "Adaptive filtering for prediction signal in video compression", 2011 IEEE International Conference on Consumer Electronics—Berlin, Institute of Electrical and Electronics Engineers, New fork. New York, XP031968553, (Sep. 2011). (Year: 2011).*

(Continued)

*Primary Examiner* — Jeffery A Williams
(74) *Attorney, Agent, or Firm* — Leydig, Voit & Mayer, Ltd.

(57) ABSTRACT

The present disclosure relates to a video coder for predictive coding a video stream of subsequent frames according to motion compensation into an encoded video bit stream, comprising a frame buffer adapted to store at least one reference frame of the video stream, the reference frame being different from a current frame of the video stream, an inter prediction unit adapted to generate a prediction block of a current block of the current frame from a reference block of the reference frame, and an adaptive sharpening filter configured to adaptively filter the prediction block.

16 Claims, 8 Drawing Sheets

US 10,834,416 B2
Page 2

(51) Int. Cl.
*H04N 19/82* (2014.01)
*H04N 19/50* (2014.01)
*H04N 19/523* (2014.01)
*H04N 19/117* (2014.01)
*H04N 19/176* (2014.01)
*H04N 19/44* (2014.01)
*G06T 5/00* (2006.01)

(52) U.S. Cl.
CPC .......... *H04N 19/176* (2014.11); *H04N 19/44* (2014.11); *H04N 19/50* (2014.11); *H04N 19/523* (2014.11); *H04N 19/82* (2014.11); *G06T 2207/20201* (2013.01)

(58) Field of Classification Search
USPC ..................................................... 375/240.12
See application file for complete search history.

(56) References Cited

U.S. PATENT DOCUMENTS

| | | |
|---|---|---|
| 8,705,622 B2 | 4/2014 | Ye et al. |
| 8,780,971 B1 | 7/2014 | Bankoski et al. |
| 2002/0063807 A1 | 5/2002 | Margulis |
| 2003/0194010 A1 | 10/2003 | Mukerjee et al. |
| 2004/0213470 A1 | 10/2004 | Sato et al. |
| 2005/0147316 A1 | 7/2005 | Deshpande et al. |
| 2005/0243913 A1 | 11/2005 | Kwon et al. |
| 2007/0091997 A1* | 4/2007 | Fogg ............... H04N 19/56 375/240.1 |
| 2008/0089417 A1 | 4/2008 | Bao et al. |
| 2008/0109041 A1 | 5/2008 | De Voir |
| 2008/0205508 A1 | 8/2008 | Ziauddin et al. |
| 2009/0257499 A1 | 10/2009 | Karczewicz et al. |
| 2010/0002770 A1 | 1/2010 | Motta et al. |
| 2010/0008430 A1 | 1/2010 | Karczewicz et al. |
| 2010/0053689 A1 | 3/2010 | Ohwaku et al. |
| 2010/0111182 A1 | 5/2010 | Karczewicz et al. |
| 2010/0128995 A1 | 5/2010 | Drugeon et al. |
| 2010/0284458 A1 | 11/2010 | Andersson et al. |
| 2011/0096236 A1 | 4/2011 | Ngan et al. |
| 2011/0299604 A1 | 12/2011 | Price et al. |
| 2011/0317764 A1 | 12/2011 | Joshi et al. |
| 2012/0170650 A1 | 7/2012 | Chong et al. |
| 2012/0200669 A1 | 8/2012 | Lai et al. |
| 2012/0307900 A1 | 12/2012 | Demos |
| 2013/0003845 A1 | 1/2013 | Zhou et al. |
| 2013/0034165 A1 | 2/2013 | Sasai et al. |
| 2013/0070858 A1 | 3/2013 | Demos |
| 2013/0077697 A1 | 3/2013 | Chen et al. |
| 2013/0182780 A1 | 7/2013 | Alshin et al. |
| 2013/0215974 A1 | 8/2013 | Chong et al. |
| 2014/0044161 A1 | 2/2014 | Chen et al. |
| 2014/0072048 A1 | 3/2014 | Ma et al. |
| 2014/0133546 A1 | 5/2014 | Bandoh et al. |
| 2014/0192862 A1 | 7/2014 | Flynn et al. |
| 2014/0192865 A1 | 7/2014 | Zhang et al. |
| 2014/0254680 A1 | 9/2014 | Ho et al. |
| 2015/0078448 A1 | 3/2015 | Puri et al. |
| 2015/0116539 A1 | 4/2015 | Nayar et al. |
| 2015/0124864 A1 | 5/2015 | Kim et al. |
| 2015/0237358 A1 | 8/2015 | Alshin et al. |
| 2016/0014411 A1* | 1/2016 | Sychev ............... H04N 19/56 375/240.12 |
| 2016/0105685 A1 | 4/2016 | Zou et al. |
| 2018/0048910 A1 | 2/2018 | Kalevo et al. |
| 2019/0215515 A1 | 7/2019 | Sychev |

FOREIGN PATENT DOCUMENTS

| | | |
|---|---|---|
| CN | 103650509 A | 3/2014 |
| CN | 104937941 A | 9/2015 |
| EP | 1841230 A1 | 10/2007 |
| EP | 2111719 B1 | 8/2014 |
| EP | 2819413 A1 | 12/2014 |
| EP | 2860980 A1 | 4/2015 |
| JP | 2001057677 A | 2/2001 |
| JP | 2003333604 A | 11/2003 |
| JP | 2004007337 A | 1/2004 |
| JP | 2006067213 A | 3/2006 |
| JP | 2006513592 A | 4/2006 |
| JP | 2008054267 A | 3/2008 |
| JP | 2010507286 A | 3/2010 |
| JP | 2010110004 A | 5/2010 |
| JP | 2011527553 A | 10/2011 |
| JP | 2013542666 A | 11/2013 |
| JP | 2014504098 A | 2/2014 |
| JP | 2015165726 A | 9/2015 |
| RU | 2358410 C2 | 6/2009 |
| RU | 2008106939 A | 8/2009 |
| RU | 2521081 C2 | 6/2014 |
| WO | 2012109528 A1 | 8/2012 |
| WO | 2013058876 A1 | 4/2013 |
| WO | 2013147495 A1 | 10/2013 |
| WO | 2014158050 A1 | 10/2014 |

OTHER PUBLICATIONS

Sychev et al, "Sharpening filter for interlayer prediction", 2014 IEEE Visual Communications and Image Processing Conference, IEEE, XP032741195, Institute of Electrical and Electronics Engineers, New York, tew York, (Dec. 2014). (Year: 2014).*

Yoon et al., "Adaptive filtering for prediction signal in video compression", 2011 IEEE International Conference on Consumer Electronics—Berlin, Institute of Electrical and Electronics Engineers, New York, New York, XP031968553, (Sep. 2011).

Sychev et al, "Sharpening filter for interlayer prediction", 2014 IEEE Visual Communications and Image Processing Conference, IEEE, XP032741195, Institute of Electrical and Electronics Engineers, New York, New York, (Dec. 2014).

Sychev et al, "Inter-layer prediction modes based on base layer sharpness filter," Joint Collaborative Team on Video Coding (JCT-VC) of ITU-T SG16 WP3 and ISO/IEC JTC 1/SC 29/WG 11, JCTVC-N0070, International Telecommunications Union, Geneva, Switzerland (Jul. 25-Aug. 2, 2013).

"Series H: Audiovisual and Multimedia Systems Infrastructure of audiovisual services—Coding of moving video Advanced video coding for generic audiovisual services," ITU-T H.264, Telecommunication Standardization Sector of ITU, International Telecommunications Union, Geneva Switzerland, (Feb. 2014).

"Line Transmission of Non-Telephone Signals Video Codec for Audiovisual Services at px64 kbits," ITU-T H.261 Telecommunication Standardization Sector of ITU, International Telecommunications Union, Geneva Switzerland, (Mar. 1993).

"Series H: Audiovisual and Multimedia Systems Infrastructure of audiovisual services—Coding of moving video Video coding for low bit rate communication," ITU-T H.263, Telecommunication Standardization Sector of ITU, International Telecommunications Union, Geneva Switzerland, (Jan. 2005).

"Series H: Audiovisual and Multimedia Systems Infrastructure of audiovisual services—Coding of moving video High efficiency video coding," ITU-T H.265, Telecommunication Standardization Sector of ITU, International Telecommunications Union, Geneva Switzerland, (Apr. 2015).

Wedi, "Adaptive Interpolation Filter for Motion Compensated Prediction," IEEE ICIP 2002, Institute of Electrical and Electronics Engineers, New York, New York, (2002).

Vatis et al., "Motion-and Aliasing-Compensated Prediction Using a Two-Dimensional Non-Separable Adaptive Wiener Interpolation Filter," IEEE, Institute of Electrical and Electronics Engineers, New York, New York, (2005).

Rusanovskyy et al., "Video Coding With Low-Complexity Directional Adaptive Interpolation Filters," IEEE Transactions on Circuits and Systems for Video Technology, vol. 19, No. 8, Institute of Electrical and Electronics Engineers, New York, New York, (Aug. 2009).

Dong et al., "Parametric Interpolation Filter for HD Video Coding," IEEE Transactions on Circuits and Systems for Video Technology,

(56) References Cited

OTHER PUBLICATIONS vol. 20, No. 12, Institute of Electrical and Electronics Engineers, New York, New York, (Dec. 2010).

Ugur et al., "Motion Compensated Prediction and Interpolation Filter Design in 1-1.265/HEVC," IEEE Journal of Selected Topics in Signal Processing, vol. 7, No. 6, Institute of Electrical and Electronics Engineers, New York, New York, (Dec. 2013).

Yoon et al., "Adaptive Prediction Block Filter for Video Coding," ETRI Journal, vol. 34, No. 1, (Feb. 2012).

Arad et al., "Enhancement by Image-Dependent Warping," IEEE Transactions on Image Processing, vol. 8, No. 8, Institute of Electrical and Electronic Engineers, New York, New York (Aug. 1999).

Prades-Nebot et al., "Image enhancement using warping technique," Electronics Letters, vol. 39 No. 1, Institute of Electrical and Electronic Engineers, New York, New York (2003).

Matsuo et al., "Enhanced Region-Based Adaptive Interpolation Filter," 28th Picture Coding Symposium, PCS2010, Nagoya, Japan, (Dec. 8-10, 2010).

Lu et al., "CE6.H related: Results on Modified Binarization for Region Boundary Chain Coding," Joint Collaborative Team on 3D Video Coding Extensions of ITU-T SG 16 WP 3 and ISO/IEC JTC 1/SC 29/WG 11, 4th Meeting, Incheon, KR, JCT3V-D0077, pp. 1-6, International Telecommunication Union, Geneva, Switzerland (Apr. 20-26, 2013).

Ma et al., "SCE4: Switchable De-ringing Filter for Inter-layer Prediction," Joint Collaborative Team on Video Coding (JCT-VC) of ITU-T SG 16 WP 3 and ISO/IEC JTC 1/SC 29/WG 11 13th Meeting, Incheon, KR, JCTVC-M0055, pp. 1-4, International Telecommunication Union, Geneva, Switzerland (Apr. 18-26, 2013).

Laude et al., "Motion Blur Compensation in Scalable HEVC Hybrid Video Coding," 2013 IEEE, pp. 1-4, Institute of Electrical and Electronics Engineers, New York, New York (2013).

Ma et al., "De-Ringing Filter for Scalable Video Coding," 2013 IEEE International Conference on Multimedia and Expo Workshops (ICMEW), pp. 1-4, Institute of Electrical and Electronics Engineers, New York, New York (Jul. 2013).

Helle et al., "A Scalable Video Coding Extension of HEVC," 2013 Data Compression Conference, Institute of Electrical and Electronics Engineers, New York, New York (Mar. 2013).

Alshina et al., "Inter-layer Filtering for Scalable Extension of HEVC," 2013 IEEE, PCS 2013, Institute of Electrical and Electronics Engineers, New York New York (2013).

Maxim et al., "SCE3: Inter-layer prediction modes based on base layer sharpness filter," Joint Collaborative Team on Video Coding (JCT-VC) of ITU-T SG 16 WP 3 and ISO/IEC JTC 1/SC 29/WG 11, JCTVC-O0163, pp. 1-7, International Telecommunications Union, Geneva, Switzerland (Oct. 23-Nov. 1, 2013).

Murakami et al., "High efficiency video coding technology HEVC / H.265 and its application," Abstract, Ohm Company, Nakagawa, Japan (2013).

Sajjad et al., "Digital image super-resolution using adaptive interpolation based on Gaussian function," Multimedia Tools and Applications, vol. 74, No. 20, XP035547508, pp. 8961-8977, Kluwer Academics Publishers, Boston, USA (Jul. 9, 2013).

Turkowski, "Filters for Common Resampling Tasks," XP002592040, pp. 1-14 (Apr. 10, 1990).

Masaru et al., "1E12.2: Results on MC interpolation filters," Joint Collaborative Team on Video Coding (JCT-VC) of ITU-T SG16 WP3 and ISO/IEC JTC1/SC29/WG11, 3rd Meeting, Guangzhou, China, JCTVC-C162, pp. 1-26, International Telecommunication Union, Geneva, Switzerland (Oct. 7-14, 2010).

Liu et al., "Motion Blur Compensation in HEVC Using Fixed-Length Adaptive Filter," IEEE Picture Coding Symposium PCS), pp. 30-34, Institute of Electrical and Electronics Engineers, New York, New York (2015).

Liu, "Unified Loop Filter for Video Compression," IEEE Transactions on Circuits and Systems for Video Technology, vol. 20, No. 10, pp. 1378-1382, Institute of Electrical and Electronics Engineers, New York, New York (Oct. 2010).

Tsai et al., "Adaptive Loop Filtering for Video Coding," IEEE Journal of Selected Topics in Signal Processing, vol. 7, No. 6, pp. 934-945, Institute of Electrical and Electronics Engineers, New York, New York (Dec. 2013).

Chiu et al., "Adaptive (Wiener) Filter for Video Compression," ITU-T Study Group 16-Conlribulion 437, Document VCEG-Al14, COM 16-C 437 R1-E, pp. 1-7, International Telecommunication Union, Geneva, Switzerland (Apr. 2008).

Zhang, "Video Image Enhancement Technology Based on Real-time Processing of FPGA," With English Abstract, North University of China, pp. 1-71, North University of China, Tayuan, China (May 2011).

\* cited by examiner

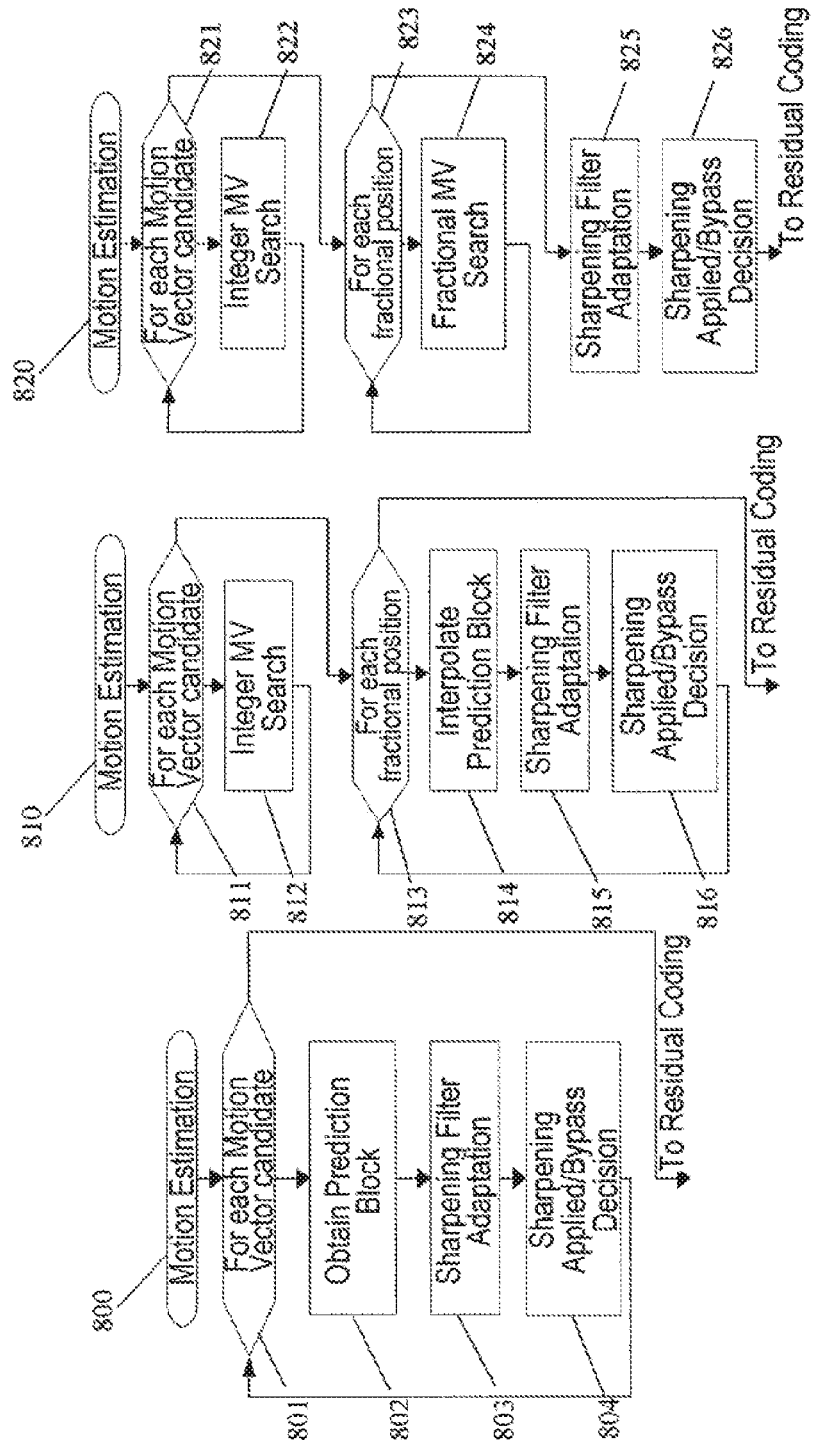

APPARATUS AND METHOD FOR VIDEO MOTION COMPENSATION

CROSS-REFERENCE TO RELATED APPLICATIONS

This application is a continuation of International Application No. PCT/RU2015/000611, filed on Sep. 25, 2015, the disclosure of which is hereby incorporated by reference in its entirety.

TECHNICAL FIELD

The present disclosure generally relates to the field of video processing and to an apparatus for video motion compensation, and specifically relates to a video coder and to a video decoder for supporting motion compensation to predict frames in a video. The present disclosure relates further to a method for coding and to a method for decoding a video stream using motion compensation. Finally, the present disclosure relates to a computer program having a program code for performing such a method.

BACKGROUND

In the field of video processing, and in particular in the field of hybrid video coding and compression, it is known to use inter and intra prediction as well as transform coding. Such hybrid video coding technologies are used in known video compression standards like H.261, H.263, MPEG-1, 2, 4, H.264/AVC or H.265/HEVC.

FIG. 1 shows a video coder according to the state of the art. The video coder 100 comprises an input for receiving input blocks of frames or pictures of a video stream and an output for generating an encoded video bit stream. The video coder 100 is adapted to apply prediction, transformation, quantization, and entropy coding to the video stream. The transformation, quantization, and entropy coding are carried out respectively by a transform unit 101, a quantization unit 102 and an entropy encoding unit 103 so as to generate as an output the encoded video bit stream.

The video stream corresponds to a plurality of frames, wherein each frame is divided into blocks of a certain size that are either intra or inter coded. The blocks of for example the first frame of the video stream are intra coded by means of an intra prediction unit 109. An intra frame is coded using only the information within the same frame, so that it can be independently decoded and it can provide an entry point in the bit stream for random access. Blocks of other frames of the video stream are inter coded by means of an inter prediction unit 110: information from coded frames, which are called reference frames, are used to reduce the temporal redundancy, so that each block of an inter coded frame is predicted from a block of the same size in a reference frame. A mode selection unit 108 is adapted to select whether a block of a frame is to be processed by the intra prediction unit 109 or the inter prediction unit 110.

For performing inter prediction, the coded reference frames are processed by an inverse quantization unit 104, an inverse transform unit 105, a loop filtering unit 106 so as to obtain the reference frames that are then stored in a frame buffer 107. Particularly, reference blocks of the reference frame can be processed by these units to obtain reconstructed reference blocks. The reconstructed reference blocks are then recombined into the reference frame.

The inter prediction unit 110 comprises as input a current frame or picture to be inter coded and one or several reference frames or pictures from the frame buffer 107. Motion estimation and motion compensation are applied by the inter prediction unit 110. The motion estimation is used to obtain a motion vector and a reference frame based on certain cost function. The motion compensation then describes a current block of the current frame in terms of the transformation of a reference block of the reference frame to the current frame. The inter prediction unit 110 outputs a prediction block for the current block, wherein said prediction block minimizes the difference between the current block to be coded and its prediction block, i.e. minimizes the residual block. The minimization of the residual block is based e.g. on a rate-distortion optimization procedure.

The difference between the current block and its prediction, i.e. the residual block, is then transformed by the transform unit 101. The transform coefficients are quantized and entropy coded by the quantization unit 102 and the entropy encoding unit 103. The thus generated encoded video bit stream comprises intra coded blocks and inter coded blocks.

Such a hybrid video coding comprises motion-compensated prediction combined with transform coding of the prediction error. For each block, the estimated motion vector is also transmitted as signalling data in the encoded video bit stream. Today's standards H.264/AVC and H.265/HEVC are based on ¼ pel displacement resolution for the motion vector. In order to estimate and compensate the fractional-pel displacements, the reference frame has to be interpolated on the fractional-pel positions. To obtain such an interpolated frame on the fractional-pel positions, an interpolation filter is used in the inter prediction unit 110.

The quality of the interpolated frame strongly depends on the properties of the used interpolation filter. Short-tap filters, e.g. bilinear filters, may suppress high frequencies and render the interpolated frame blurred. Other filters like long-tap filters may preserve high frequencies but generate some ringing artifacts in the neighborhood of sharp edges. Another problem is that the motion compensation makes use of a previously encoded and reconstructed frame as a reference frame: the reference frame may contain artifacts caused by quantization of transform coefficient, which is referred to as Gibbs effect. Because of these artifacts, the edges as well as the area around the edges may also be distorted.

Is it known in the prior art that the quality of the edges may be increased by applying a sharpening or de-blurring post-filter to the decoded frame. The problem of such post-filtering design is that the sharpening filter is not included in to encoding process. Thus the effect of the sharpening filter cannot be taken into account during the rate-distortion optimization procedure. This may lead to reduced objective quality metrics, like the peak signal-to-noise-ratio (PSNR).

To increase the objective quality, it is also known in the prior art to include a sharpening filter into the loop filtering unit 106. Accordingly, the sharpening filter is applied to the reconstructed reference frame and may improve motion-compensated prediction by removing compression artifacts in the reference frame. However, such a loop filtering technique cannot remove artifacts caused by the motion interpolation filter.

SUMMARY

Having recognized the above-mentioned disadvantages and problems, the present disclosure aims to improve the state of the art. In particular, an object of the present disclosure is to provide a video coder, a coding method, a video decoder, and a decoding method for an improved coding and decoding of a video stream of subsequent frames.

The present disclosure, for example, intends to improve the quality of the inter predictive coding. For example, the disclosure intends to remove artifacts caused by the motion estimation and motion compensation. For example, it is an aim of the present disclosure to reduce negative effects of the motion interpolation filter, i.e. to reduce negative effects of the interpolation of the reference frame on fractional-pel positions as well as improving quality of prediction by reducing quantization artefacts of reference frame.

A first aspect of the present disclosure provides a video coder for predictive coding a video stream of subsequent frames according to motion compensation into an encoded video bit stream. The video coder comprises a frame buffer adapted to store at least one reference frame of the video stream, said reference frame being different from a current frame of the video stream. The video coder comprises an inter prediction unit adapted to generate a prediction block of a current block of the current frame from a reference block of the reference frame. The video coder comprises an adaptive sharpening filter configured to adaptively filter the prediction block.

Thereby, applying the adaptive sharpening filter to the prediction block improves the quality of the inter predictive coding in that it removes or at least reduces the ringing artifacts caused by the interpolation of the reference frame/block on fractional-pel positions, i.e. caused by the motion interpolation filter, while advantageously keeping quality interpolated edges. It also removes or at least reduces the ringing artifacts, also referred to as Gibbs effect, caused by the quantization of transform coefficients in the reference block. It further on reduces the blurring of edges caused by the quantization and motion interpolation, and also reduces the blurring of edges caused by motion blur. Additionally, the present disclosure allows for increasing the subjective quality of edges in the reconstructed frame/block.

Thereby, the placement of the sharpening filter according to the disclosure after the motion interpolation filter, i.e. after the inter prediction unit, causes the sharpening filter to carry out the task of the in-loop reference filters, i.e. of the loop filtering unit, while at the same time the artifacts caused by motion interpolation filtering can be removed or at least reduced. Also, the use of an adaptive sharpening filter makes it possible to adapt to local features of the video content and particularly of the prediction block, so that the coding of even small blocks only requires a reduced signalling overhead for the transmission to a decoder.

In an implementation form of the video coder according to the first aspect, the video coder comprises a control unit. The adaptive sharpening filter is configured to be controlled by at least one adaptive parameter. The control unit is configured to determine a parameter value of the adaptive parameter and supply the determined parameter value to the adaptive sharpening filter.

Thereby, the prediction block is filtered by a sharpening filter that can be adapted to the specific content of the video. The adaptation can take account of local features of the video content and the required signalling overhead can be limited due to using of parametric representation of adaptive sharpening filter with only one coefficient for adaptation and transmission. Particularly, the size of the blocks used for predictive coding can be reduced without at the same time increasing the signalling overhead.

In a further implementation form of the video coder according to the first aspect, the control unit is configured to supply different parameter values for the adaptive parameter and to select one of the different parameter values based on a minimization of a residual block, said residual block being the difference between the current block and the prediction block, or based on a cost criterion such as, for example, a rate distortion optimization.

Thereby, the motion compensation can be further improved. The residual blocks obtained for different values of the at least one adaptive parameter can be compared. By selecting the prediction block that minimizes the residual block or that minimizes a cost criterion, the motion compensation can be improved. The parameter value corresponding to the selected prediction block is then selected from among the different parameter values so as to improve the motion compensation.

In a further implementation form of the video coder according to the first aspect, the sharpening filter is a non-linear filter.

Thereby, that usage of such a non-linear sharpening filter is preferable for motion prediction enhancement. Traditional edge enhancement techniques based on linear sharpening or de-blurring filters, like unsharp masking techniques, may increase subjective quality but cannot suppress the ringing artifacts caused by motion interpolation filtering. It has also been discovered that in most cases, such linear sharpening even may increase ringing and reduce the objective performance characteristics. On the other, non-linear filters can provide better results for ringing elimination and are thus advantageous. Also, the use of a non-linear design for the sharpening filter, i.e. for the adaptive sharpening filter, can advantageously reduce the number of adaptive parameters and thus the signalling overhead.

In a further implementation form of the video coder according to the first aspect, the sharpening filter comprises an edge map calculation unit adapted to generate an edge map of a source block, said source block being the reference block or the prediction block. The sharpening filter comprises a blurring filter adapted to blur the edge map of the source block. The sharpening filter comprises a high-pass filter adapted to generate, by high-pass filtering the blurred edge map, a derivative vector for each position of the source block. The sharpening filter comprises a scaling unit adapted to generate a displacement vector by scaling the derivative vector with a sharpening strength coefficient. The sharpening filter comprises a warping unit adapted to warp the prediction block based on the displacement vector. The adaptive parameter includes the sharpening strength coefficient.

Thereby, this structure of the sharpening filter defines a non-linear sharpening filter that advantageously can provide better results in terms of elimination of ringing artifacts. Also, the use of the sharpening strength coefficient as adaptive parameter implies that only one adaptive parameter is required, which further reduces the signalling overhead.

In a further implementation form of the video coder according to the first aspect, the sharpening filter is always enabled.

In a further implementation form of the video coder according to the first aspect, the video coder comprises a control unit configured to control at least one of a selective bypass of the adaptive sharpening filter and a selective application of the adaptive sharpening filter.

Thereby, a decision can be taken by the control unit to apply or bypass the sharpening filter. The decision can then be adapted to each particular case, for example to the particular video stream to be encoded. Also, the sharpening filter can be bypassed to save computational resources in the video coder. On the other hand, the sharpening filter can be applied if the priority shall be given to the improvement of the interpolation quality and the reduction of artifacts.

In a further implementation form of the video coder according to the first aspect, the control unit is adapted to control the at least one of the selective bypass and the selective application depending on a cost function to minimize a residual block. Said residual block may be the difference between the current block and the prediction block. The cost function may be, for example, based on the rate distortion optimization.

Thereby, the possibility of bypassing or applying the sharpening filter can be further used to improve the motion compensation. The two residual blocks derived respectively from the prediction block outputted by the inter prediction unit and from the prediction block outputted by the sharpening filter can be compared in terms of the cost function. By choosing the prediction block that minimized the residual block and by correspondingly applying or bypassing the sharpening filter, the quantity of data and for example the quantity of transform coefficients to be encoded can be reduced.

In a further implementation form of the video coder according to the first aspect, the video coder comprises an encoding unit adapted to generate the encoded video bit stream. The control unit is adapted to transmit to the encoding unit sharpening filter information reflecting the at least one of the selective bypass and the selective application of the sharpening filter. The encoding unit is adapted to add the sharpening filter information in the encoded video bit stream.

Thereby, when decoding the encoded video bit stream, it is possible to obtain this sharpening filter information and to accordingly apply or bypass the sharpening filter on the decoder side, so as to guarantee a correct decoding.

In a further implementation form of the video coder according to the first aspect, the adaptive parameter information or the sharpening filter information is added at a block level for each prediction block, for an arbitrary or regular region of the frame, at a frame level, at a GOP (group of pictures) level, at a PPS (picture parameter set) level or at an SPS (sequence parameter set) level.

Thereby, it is possible to set the sharpening filter information to a desired granularity so that the signalling can be optimized.

In a further implementation form of the video coder according to the first aspect, the adaptive sharpening filter comprises a single adaptive parameter.

Thereby, the signalling overhead that is required for the adaptation and that is transmitted to a decoded can be further reduced.

A second aspect of the present disclosure provides a method for predictive coding a video stream of subsequent frames according to motion compensation into an encoded video bit stream. The method comprises storing at least one reference frame of the video stream, said reference frame being different from a current frame of the video stream. The method comprises generating a prediction block of a current block of the current frame from a reference block of the reference frame. The method comprises adaptively filtering the prediction block.

Further features or implementations of the method according to the second aspect of the disclosure can perform the functionality of the video coder according to the first aspect of the disclosure and its different implementation forms.

A third aspect of the present disclosure provides a video decoder for decoding an encoded video bit stream obtained by predictive coding a video stream of subsequent frames according to motion compensation. The video decoder comprises a frame buffer adapted to store at least one reference frame obtained from the encoded video bit stream, said reference frame being different from a current frame of the encoded video bit stream. The video decoder comprises an inter prediction unit adapted to generate a prediction block of a current block of the current frame from a reference block of the reference frame. The video decoder comprises an adaptive sharpening filter adapted to adaptively filter the prediction block.

Thereby, the advantages obtained with respect to the video coder according to the first aspect are also given with respect to the video decoder according to the third aspect.

In an implementation form of the video decoder according to the third aspect, the video decoder comprises a control unit. The adaptive sharpening filter is configured to be controlled by at least one adaptive parameter. The control unit is configured to determine a parameter value of the adaptive parameter and to supply the determined parameter value to the adaptive sharpening filter.

Thereby, the sharpening filter can be advantageously adapted by means of the at least one adaptive parameter.

In an implementation form of the video decoder according to the third aspect, the control unit is configured to determine the parameter value of the adaptive parameter depending on adaptive parameter information obtained from the encoded video bit stream.

Thereby, the adaptive parameter can be obtained from the encoded video bit stream generated by video coder. This allows that both the video coder and the video decoder carry out the same adaptation of the sharpening filter and that the video obtained by the video decoder corresponds to the video encoded by the video coder.

In an implementation form of the video decoder according to the third aspect, the video decoder comprises a control unit adapted to control at least one of a selective bypass of the adaptive sharpening filter and a selective application of the adaptive sharpening filter.

Thereby, the decision to use or not the sharpening filer unit can be adapted to each particular case. Also, the sharpening filter can be bypassed to save computational resources in the video coder and the video decoder. On the other hand, the sharpening filter can be applied if the priority shall be given to the improvement of the interpolation quality and the reduction of artifacts.

In an implementation form of the video decoder according to the third aspect, the control unit is adapted to control the at least one of the selective bypass and the selective application based on sharpening filter information obtained from the encoded video bit stream.

Thereby, the video decoder can be adapted to the video coder that may advantageously add in the encoded video bit stream such sharpening filter information that reflects the switching on or off of the sharpening filter on the video coder side.

Further features or implementations of the video coder according to the first aspect of the disclosure, particularly regarding the sharpening filter and its structure, are also applicable to the video decoder according to the third aspect of the disclosure.

A fourth aspect of the present disclosure provides a method for decoding an encoded video bit stream obtained by predictive coding a video stream of subsequent frames according to motion compensation. The method comprises storing at least one reference frame obtained from the encoded video bit stream, said reference frame being different from a current frame of the encoded video bit stream. The method comprises generating a prediction block of a current block of the current frame from a reference block of the reference frame. The method comprises adaptively filtering the prediction block.

Further features or implementations of the method according to the fourth aspect of the disclosure can perform the functionality of the video decoder according to the third aspect of the disclosure and its different implementation forms.

A fifth aspect of the present disclosure provides a computer program having a program code for performing such a coding and/or decoding method when the computer program runs on a computing device.

The disclosure proposes a motion compensation improvement by applying an adaptive sharpening filter to the motion prediction signal i.e. to the prediction blocks. It is proposed to improve the motion compensation by reducing ringing artifacts and increasing the sharpness of edges in motion prediction blocks. It is proposed to apply the sharpening filter as a prediction filter placed both in the encoder and the decoder for motion compensation enhancement. A non-linear sharpening prediction filter can be used for motion compensation improvement.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings, in which FIG. 8a and FIG. 8b and FIG. 8c show possible embodiments for the sharpening adaptation shown in FIG. 7.

DETAILED DESCRIPTION OF EMBODIMENTS

Figure 2:
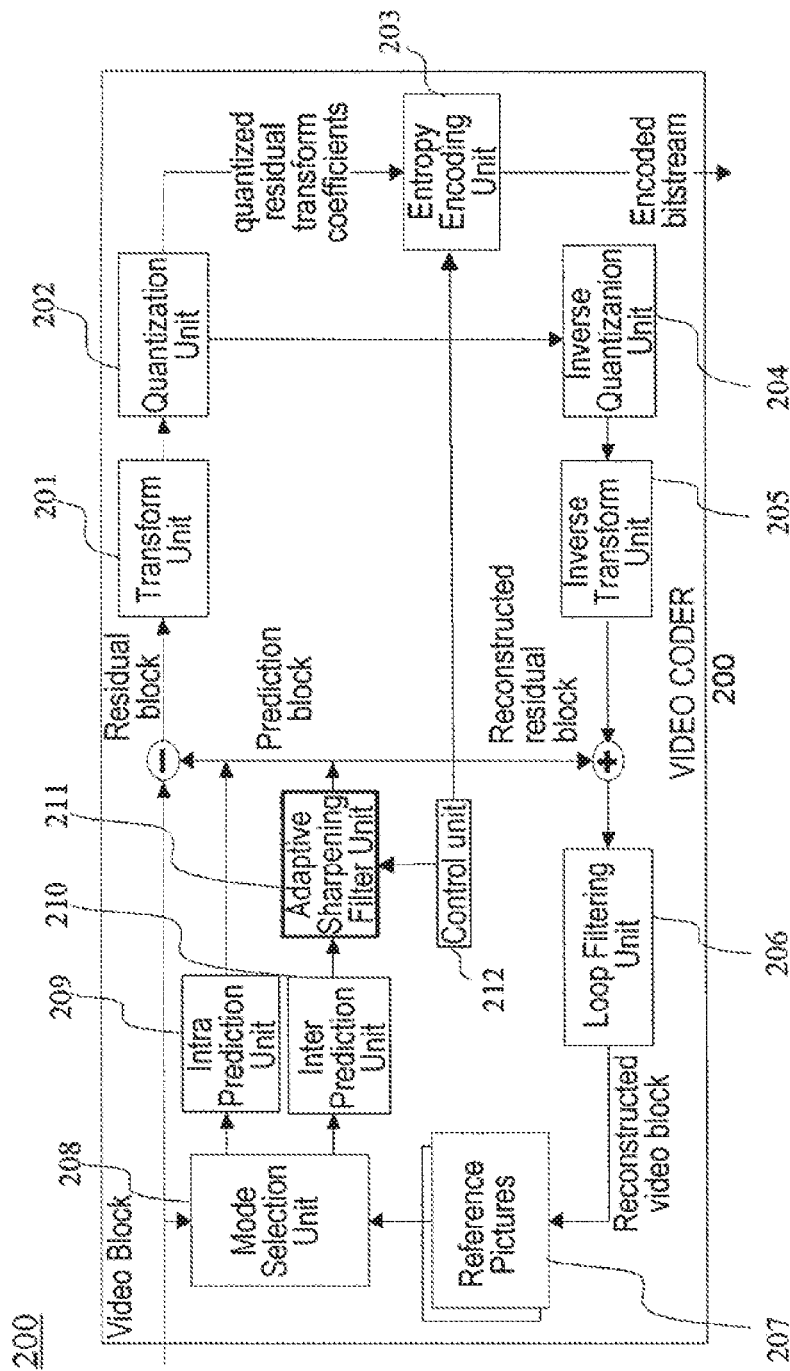
FIG. 2 shows a video coder according to an embodiment of the present disclosure.

FIG. 2 shows a video coder according to an embodiment of the present disclosure, and particularly a video coder 200 for predictive coding a video stream of subsequent frames according to motion compensation into an encoded video bit stream.

The video coder 200 comprises particularly a frame buffer 207, an inter prediction unit 210, and a sharpening filter 211.

The frame buffer 207 is adapted to store at least one reference frame or picture of the video stream. Said reference frame is different from a current frame of the video stream. Particularly and in the context of the disclosure, the current frame is a frame of the video stream that is currently encoded, while the reference frame is a frame of the video stream that has already been encoded. In the followings, any reference to the feature "frame" may be replaced by a reference to the feature "picture".

The inter prediction unit 210 is adapted to generate a prediction block of a current block of the current frame from a reference block of the reference frame. The reference frame is preferably the reference frame stored in the frame buffer 207, while the current block preferably corresponds to the input of the video coder 200 referred to as video block in FIG. 2. Particularly, the current frame is encoded using an inter coding technique, i.e. the current frame is predicted from the at least one reference frame that is distinct from the current frame. The reference frame can be a previous frame, i.e. a frame that is located prior to the current frame within the video stream of subsequent frames. Alternatively, if forward prediction is used, the reference frame can be a future frame, i.e. a frame that is located after the current frame. In case of a plurality of reference frames, at least one can be such a previous frame and at least one of them can be such a future frame. A reference frame can be intra coded, i.e. can be coded without using any further frame and without any dependence on other frames, so that it can be independently decoded and it can serve as entry point for random video access.

Particularly, the inter prediction unit 210 is adapted to perform motion estimation by generating a motion vector and estimating motion between the reference block of the reference frame and the current block of the current frame. Said motion estimation is performed during encoding to find the motion vector pointing to the best reference block in the reference frame based on certain cost function being, for example, the rate-distortion optimization. Beside the motion estimation, the inter prediction unit 210 is further adapted to perform motion compensation by generating the prediction block for the current block on the basis of the motion vector and the reference block.

Particularly, the motion prediction comprises a motion estimation unit and a motion compensation unit. The motion vector is generated by using a motion estimation unit. The reference block and the current block are preferably a respective area or sub-area of the reference frame and the current frame. Such a block may have a regular shape, like e.g. a rectangular shape, or an irregular shape. Alternatively, the blocks can have the same size as the frames. Both the current block and the reference block have the same size. The size of the blocks can be defined by means of block mode information transmitted as side information or signalling data to the decoder. A block can correspond to a coding unit that is a basic coding structure of the video sequence of a pre-defined size, containing a part of a frame, e.g. 64×64 pixels.

The prediction block is generated for the current block in view of the reference block. Particularly, a plurality of prediction blocks can be generated for a plurality of current blocks of the current frame in view of a plurality of reference blocks. These reference blocks can be part of a single reference frame or can be selected from different reference frames. Several prediction blocks can be generated for the current frame, and the prediction blocks generated for the current frame can be combined to obtain a prediction frame of the current frame.

The sharpening filter 211 is an adaptive sharpening filter that is configured to adaptively filter the prediction block. The sharpening filter 211 is thus applied to the prediction block generated by the inter prediction unit 210. The sharpening filter 211 proposed by the disclosure is added after the inter prediction unit 210 so as to enhance the prediction block obtained by the inter prediction, i.e. obtained by the motion prediction comprising the motion estimation and the motion compensation. The sharpening filter 211 is thus adapted to generate a sharpened prediction block.

The video coder 200 advantageously comprises a control unit 212, and the adaptive sharpening filter 211 utilizes (i.e., is configured to be controlled by) at least one adaptive parameter. The control unit 212 is configured to determine a parameter value of the adaptive parameter and supply the determined parameter value to the adaptive sharpening filter 211.

Preferably, the adaptive sharpening filter 211 utilizes only one adaptive parameter, values of which being set by the control unit 212.

The control unit 212 may be configured to determine the parameter value by supplying different parameter values for the adaptive parameter and selecting one of the different parameter values based on a minimization of a residual block, said residual block being the difference between the current block and the prediction block, or based on a cost criterion that is for example a rate distortion optimization.

The video coder 200 advantageously comprises an encoding unit 203 configured to generate the encoded video bit stream. The control unit 212 is configured to transmit to the encoding unit 203 adaptive parameter information about the determined parameter value. The encoding unit 203 is configured to add the adaptive parameter information in the encoded video bit stream. This means that, once the control unit 212 has set the adaptive parameter to a given value or the adaptive parameters to respective given values, said control unit 212 transmits the given value(s) to the encoding unit 203 that adds the given value(s) to the encoded video bit stream as signalling data.

Figure 1:
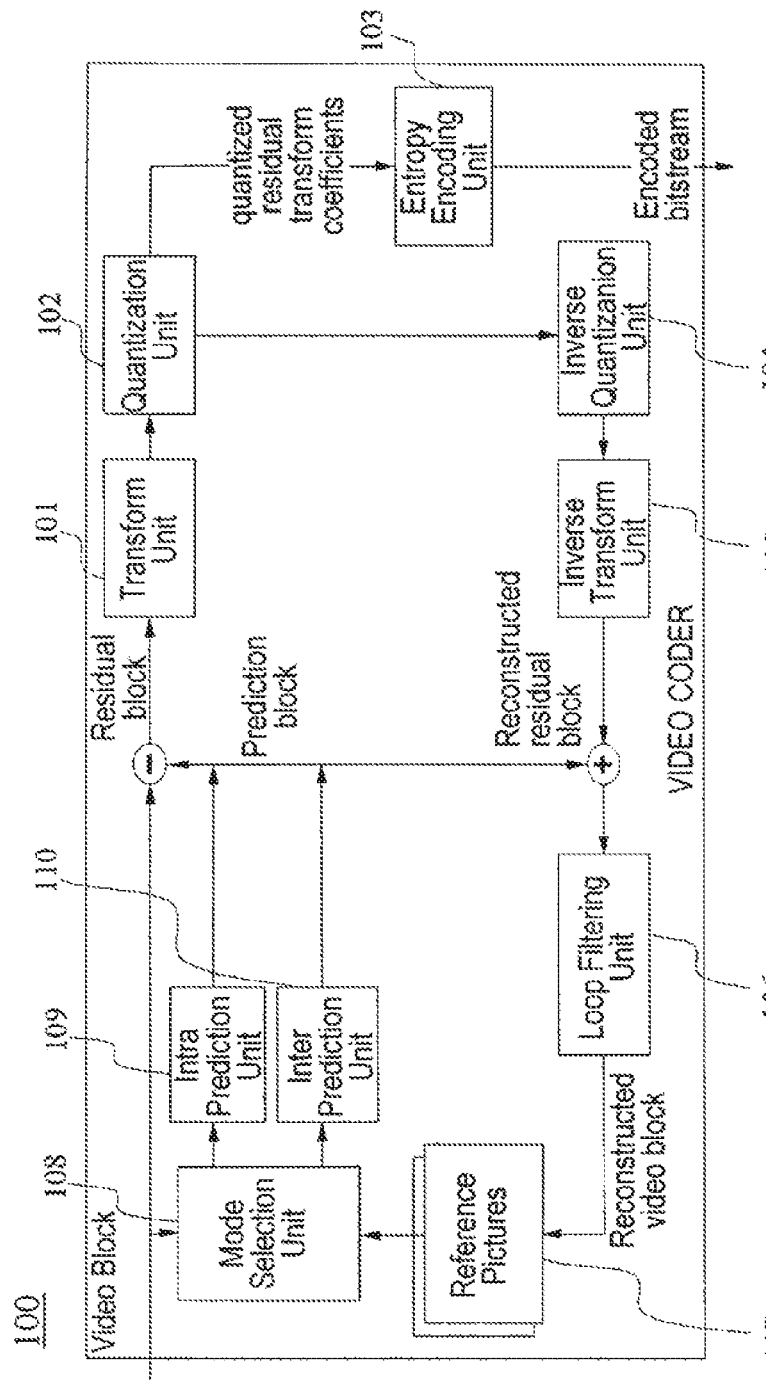
FIG. 1 shows a video coder according to the state of the art.

The video coder 200 of FIG. 2 comprises further units similar to the video coder 100 of FIG. 1 for particularly supporting hybrid video coding. For example, the video coder 200 comprises similar units that are a transform unit 201, a quantization unit 202 and the entropy encoder or entropy encoding unit 203 for, as already known in the art, generating transform coefficients via a transformation into the frequency domain, quantizing the coefficients and entropy coding the quantized coefficients for example together with signalling data. The input of the transform unit 201 is a residual block defined as the difference between the current block of the current frame, referred to as video block in FIG. 2, and the prediction block outputted by the inter prediction unit 210, the sharpening filter 211 or an intra prediction unit 209. The entropy encoding unit 203 is adapted to generate as an output the encoded video bit stream.

The video coder 200 comprises further similar units that are an inverse quantization unit 204, an inverse transform unit 205 and a loop filtering unit 206. The quantized transform coefficients generated by the quantization unit 202 are inverse quantized and inverse transformed by respectively the inverse quantization unit 204 and inverse transform unit 205 to obtain a reconstructed residual block corresponding to the residual block fed to the transform unit 201. The reconstructed residual block is then added to the prediction block previously used for generating the residual block, so as to obtain a reconstructed current block corresponding to the current block, this reconstructed current block being referred to as reconstructed video block in FIG. 2. The reconstructed current block may be processed by the loop filtering unit 206 to smooth out artifacts that are introduced by the block-wise processing and quantization. The current frame, which comprises at least one current block or advantageously a plurality of current blocks, can then be reconstructed from the reconstructed current block(s). This reconstructed current frame can be stored in the frame buffer 207 for serving as reference frame for inter prediction of another frame of the video stream.

A mode selection unit 208 is provided in the video coder 200 for, similarly to FIG. 1, selecting whether an input block of the video coder 200 is to be processed by the intra prediction unit 209 or the inter prediction unit 210. The mode selection unit 208 correspondingly chooses if a block of a frame is to be intra coded using only information from this frame, or is to be inter coded using additional information from other frames i.e. from at least one reference frame stored in the frame buffer 207.

The intra prediction unit 209 is responsible for the intra prediction and generates a prediction block based on intra prediction. As mentioned above, the inter prediction unit 210 is responsible for the inter prediction and generates a prediction block that is predicted from a block of the same size in a reference frame, so as to reduce the temporal redundancy.

Particularly, the sharpening filter 211 can be always enabled. This means that the prediction block generated by the inter prediction unit 210 is always fed to the sharpening filter 211, and that the residual block is always obtained by the difference of the current block and the sharpened prediction block that is outputted by the sharpening filter 211.

Alternatively, the sharpening filter 211 can be selectively bypassed and/or selectively applied. In case the sharpening filter 211 is applied, the sharpening filter 211 generates a sharpened prediction block and the residual block is obtained by the difference of the current block and the sharpened prediction block that is outputted by the sharpening filter 211. In case the sharpening filter 211 is bypassed, the residual block is obtained by the difference of the current block and the prediction block that is outputted by the inter prediction unit 210.

The selective bypass and/or application of the sharpening filter 211 may be controlled by the control unit 212. The control unit may be, for example, adapted to control the application and/or bypassing of the sharpening filter 211 depending on a cost function to minimize the residual block. The cost function may be, for example, based on the rate distortion optimization. The cost function may be particularly applied to the residual block obtained from the prediction block that is outputted by the sharpening filter 211, and to the residual blocks obtained from the prediction block that is outputted by the inter prediction unit 210. Depending on the result of the cost function, the sharpening filter 211 may be either applied or bypassed.

The decision of the control unit 212 to bypass or apply the sharpening filter 211 can be transmitted as signalling data within the encoded video bit stream generated by the encoding unit or entropy encoding unit 203. The control unit 212 transmits sharpening filter information to the encoding unit 203, said sharpening filter information reflecting at least one of the selective bypass and selective application of the sharpening filter 211. The encoding unit 203 then adds the sharpening filter information as signalling data in the encoded video bit stream.

The sharpening filter information can be in the form of a sharpening filter flag that can take two values, for example 0 and 1. One of these two values, for example 1, defines that the sharpening filter is applied, while the other value defines that the sharpening filter is bypassed. Alternatively, the absence of sharpening filter information can be interpreted as reflecting the bypassed state of the sharpening filter, while the presence of sharpening filter information can reflect the application state.

The granularity of the adaptive parameter information and/or sharpening filter information can vary. The sharpening filter information can for example added at a block level for each prediction block, for an arbitrary or regular region of the frame, at a frame level, at a GOP (group of pictures) level, at a PPS (picture parameter set) level or at an SPS (sequence parameter set) level. If the sharpening filter information is added at a block level for each prediction block, the encoding unit 203 can add the sharpening filter information for each prediction block generated by the inter prediction unit 210. The encoding unit 203 then adds to the encoded video bit stream, for each prediction block, the corresponding quantized residual transform coefficients and the corresponding sharpening filter information.

Figure 3:
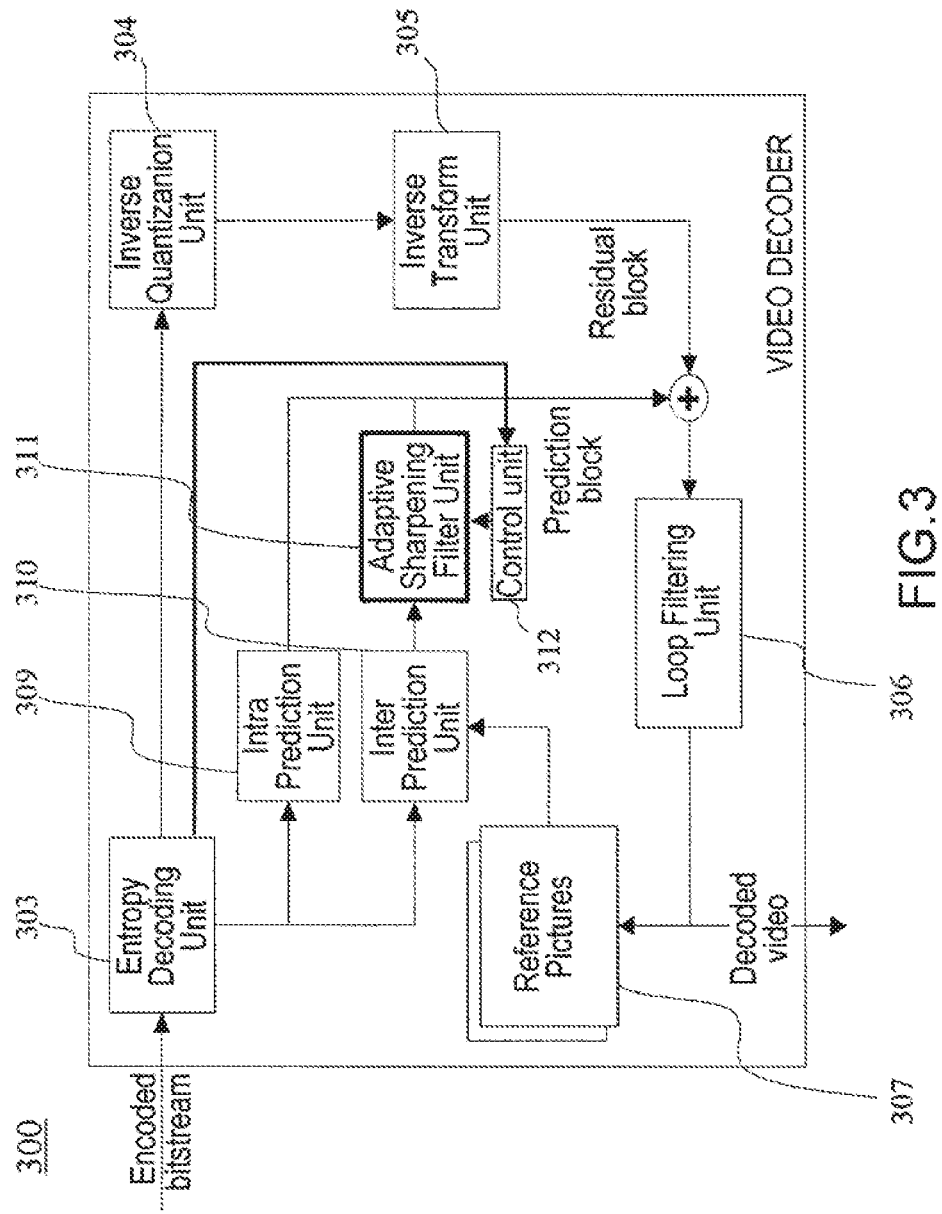
FIG. 3 shows a video decoder according to an embodiment of the present disclosure.

FIG. 3 shows a video decoder according to an embodiment of the present disclosure, and particularly a video decoder 300 for decoding an encoded video bit stream obtained by predictive coding a video stream of subsequent frames according to motion compensation.

The video decoder 300 comprises particularly a frame buffer 307, an inter prediction unit 310, and an adaptive sharpening filter 311. The frame buffer 307 is adapted to store at least one reference frame obtained from the encoded video bit stream, said reference frame being different from a current frame of the encoded video bit stream. The inter prediction unit 310 is adapted to generate a prediction block of a current block of the current frame from a reference block of the reference frame. The adaptive sharpening filter 311 is configured to adaptively filter the prediction block.

Advantageously, the video decoder 300 comprises a control unit 312, and the adaptive sharpening filter 311 utilizes at least one adaptive parameter. The control unit 312 is configured to determine a parameter value of the adaptive parameter and to supply the determined parameter value to the adaptive sharpening filter 311.

The control unit 312 may be particularly configured to determine the parameter value of the adaptive parameter depending on adaptive parameter information obtained from the encoded video bit stream.

The decoder 300 is adapted to decode the encoded video bit stream generated by the video coder 200, and both the decoder 300 and the coder 200 generate identical predictions. The features of the frame buffer 307, the inter prediction unit 310, and the sharpening filter 311 are similar to the features of the frame buffer 207, the inter prediction unit 210, and the sharpening filter 211 of FIG. 2.

For ensuring identical predictions on the coder side and on the decoder side, the adaptive parameter(s) of the sharpening filter of the coder 200 may be passed to the decoder 300 as signalling data. As alternative solution, the adaptive parameter(s) may be derived on the decoder side without sending corresponding signalling data. Particularly, the adaptive parameter(s) may be derived from a surrounding area or from the reference frame. For example, the parameter(s) may be derived from a surrounding block in the current frame, e.g. can be the same as adaptive parameter(s) of a surrounding block with respect to the current block.

Particularly, the video decoder 300 may comprise further units that are also present in the video coder 200 like e.g. an inverse quantization unit 304, an inverse transform unit 305, a loop filtering unit 306 and an intra prediction unit 309, which respectively correspond to the inverse quantization unit 204, the inverse transform unit 205, the loop filtering unit 206 and the intra prediction unit 209 of the video coder 200. An entropy decoding unit 303 is adapted to decode the received encoded video bit stream and to correspondingly obtain quantized residual transform coefficients and, if present, sharpening filter information. The quantized residual transform coefficients are fed to the inverse quantization unit 304 and an inverse transform unit 305 to generate a residual block. The residual block is added to a prediction block and the addition is fed to the loop filtering unit 306 to obtain the decoded video. Frames of the decoded video can be stored in the frame buffer 307 and serve as a reference frame for inter prediction.

Particularly, the sharpening filter 311 may be always enabled. This means that the prediction unit filtered by the sharpening filter is used to obtain the decoded video.

Alternatively, the sharpening filter 311 may be selectively bypassed or applied by, for example, the control unit 312. The sharpening filter information obtained by the decoding unit 303 from the encoded video bit stream may be fed to the control unit 312 that controls the bypassing and/or application of the sharpening filter 311 depending on the sharpening filter information.

The sharpening filter information reflects the bypassing or application of the sharpening filter 311 and preferably corresponds to the sharpening filter information added by the video coder 200 to the encoded video bit stream. The different aspects regarding for example the form and the granularity of the sharpening filter information discussed with respect to the video coder 200 also apply with respect to the video decoder 300.

Figure 4:
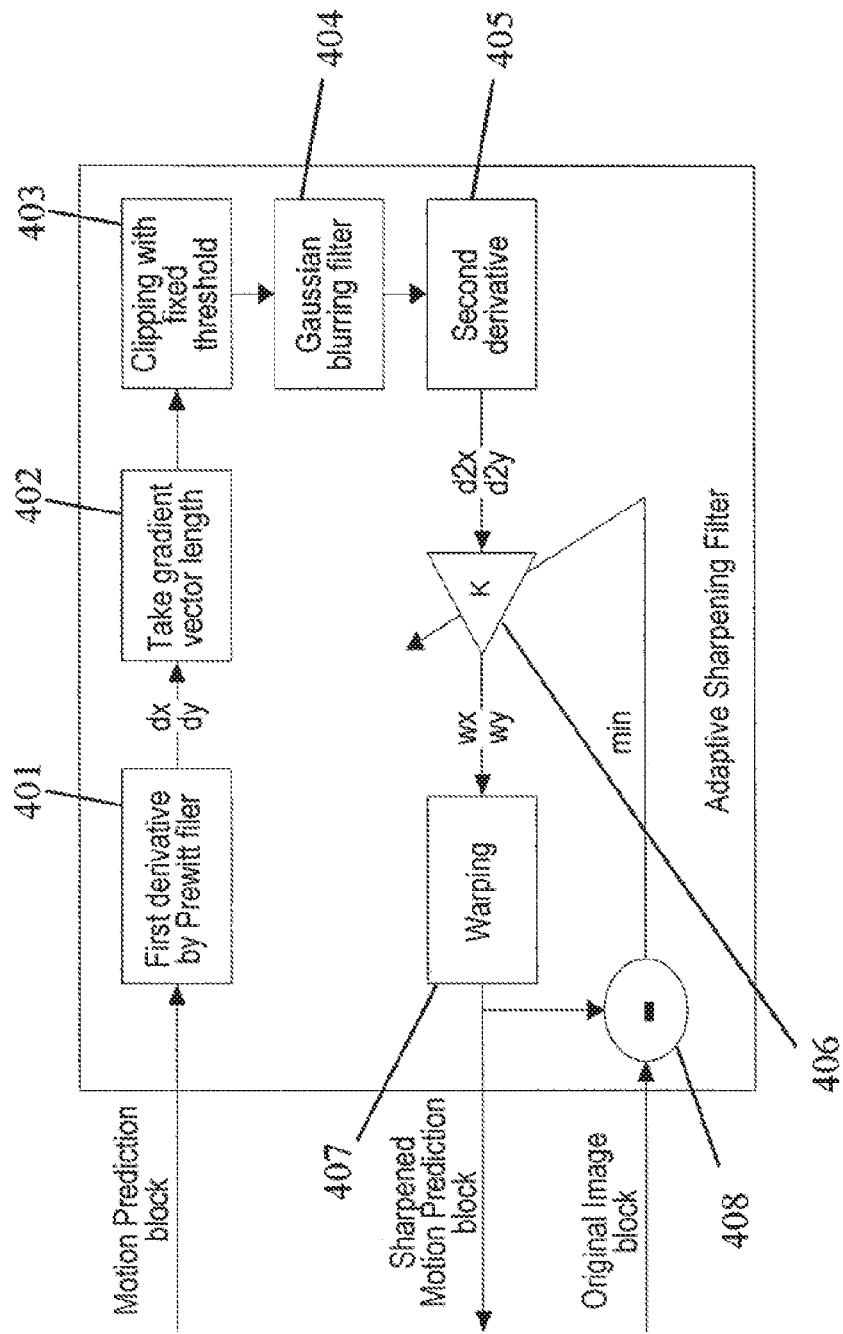
FIG. 4 shows an embodiment of a sharpening filter according to the present disclosure.

FIG. 4 shows an embodiment of an adaptive sharpening filter 400 according to the present disclosure, and particularly an embodiment of the adaptive sharpening filter 211 of the video coder 200. The adaptive sharpening filter 311 of the video decoder 300 may be slightly different from the adaptive sharpening filter 211 shown in FIG. 4, the difference being discussed below.

The sharpening filter 400 is preferably a non-linear filter. The usage of a non-linear sharpening filter, instead of a linear filter, is preferable for removing artifacts caused by the motion interpolation filter and the quantization of the reference block or frame. The choice of a non-linear filter can reduce the number of adaptive parameters of the sharpening filter 400. In particular, the non-linear filter can utilize only one adaptive parameter, so that the signalling overhead of the encoded video bit stream is reduced. While the present disclosure also covers the use of more than one adaptive parameter to control sharpening filter 400, a sharpening filter utilizing only one adaptive parameter is a particularly advantageous embodiment.

Particularly, the sharpening filter 400 comprises an edge map calculation unit 401, 402, a blurring filter 404, a high-pass filter 405, a scaling unit 406 and a warping unit 407.

The edge map calculation unit 401, 402 is adapted to generate an edge map of a source block, said source block being the reference block or the prediction block. The blurring filter 404 is adapted to blur the edge map of the source block. The high-pass filter 405 is adapted to generate, by high-pass filtering the blurred edge map, a derivative vector (d2x, d2y) for each position of the source block. The scaling unit 406 is adapted to generate a displacement vector (wx, wy) by scaling the derivative vector (d2x, d2y) with a sharpening strength coefficient k. The warping unit 407 is adapted to warp the prediction block based on the displacement vector (wx, wy).

Thereby, the adaptive parameter controlling the sharpening filter 400 is the sharpening strength coefficient k. The sharpening filter 400 shown in FIG. 4 is an embodiment of the present disclosure with only one adaptive parameter.

The edge map calculation unit 401, 402 can comprise a gradient vector unit 401 adapted to generate a gradient vector (dx, dy) for each position of the source block, and a gradient vector length unit 402 adapted to calculate the length of the gradient vector (dx, dy) of each position so as to generate the edge map of the source block. Thereby, this structure allows for the generation of an edge map that can be further processed by the blurring filter, the high-pass filter and the scaling unit to generate the warping displacement vector.

The gradient vector can be obtained by taking the first derivative separately for dx and dy, i.e. separately for both a horizontal and a vertical direction of the source block referred to as source block in FIG. 4, by applying a corresponding Prewitt filter in accordance with the following equations:

$$dx = \begin{bmatrix} 1 & 0 & -1 \\ 1 & 0 & -1 \\ 1 & 0 & -1 \end{bmatrix} * img$$

$$dy = \begin{bmatrix} 1 & 1 & 1 \\ 0 & 0 & 0 \\ -1 & -1 & -1 \end{bmatrix} * img$$

The edge map can be obtained by the gradient vector length unit 402 by calculating the gradient vector length in accordance with the following equation:

$$abs = \sqrt{dx^2 + dy^2}$$

Advantageously, the sharpening filter 400 comprises a clipping unit 403 adapted to clip the edge map of the source block, said clipping unit 403 being located between the edge map calculation unit 401, 402 and the blurring filter 404. Thereby, the clipping of the edge map with thresholds is advantageous in that it prevents the processing of extremely high and low values of warping vectors.

The step of blurring of the clipped edge map can be obtained by a blurring filter 404 in form of a Gaussian filter that can be defined as follows:

$$G = \begin{bmatrix} 1 & 4 & 7 & 4 & 1 \\ 4 & 16 & 26 & 16 & 4 \\ 7 & 26 & 41 & 26 & 7 \\ 4 & 16 & 26 & 16 & 4 \\ 1 & 4 & 7 & 4 & 1 \end{bmatrix}$$

The high-pass filter is used to obtain, separately for d2x and d2y, the second derivative, for example according to the followings:

$$d^2x = \begin{bmatrix} 1 & 0 & -1 \end{bmatrix}$$

$$d^2y = \begin{bmatrix} 1 \\ 0 \\ -1 \end{bmatrix}$$

The displacement vector (wx,wy) is obtained by scaling the second derivative vector (d2x, d2y) with the coefficient k, wherein the coefficient k can be considered as sharpening strength, according to the following equations:

$$wx = k * d^2x$$

$$wy = k * d^2y$$

The warping unit 407 includes an interpolation filter that is e.g. a bi-linear interpolation filter to obtain sample values at fractional-pel positions. The warping unit 407 uses the displacement vector generated by the scaling unit 406. Thereby, the overall quality of the video coder is improved while at the same time providing an interpolation of the reference frame/block on desired fractional-pel positions.

A subtracting unit 408 is adapted to build the difference between the sharpened prediction block generated by the warping unit 407 and the current block, said current block corresponding to the block to be encoded. The subtracting unit 408 in fact generates the residual block. The adaptive sharpening filter 400, or the control unit 211 controlling the adaptive sharpening filter 400, is adapted to find the optimum sharpening strength k for example by minimizing the residual block or by a cost criterion based e.g. on the rate-distortion.

The difference between the adaptive sharpening filters of the video coder 200 and of the video decoder 300 preferably consists in this subtracting unit 408 and in this minimization of the residual block. In the video decoder 300, the adaptive parameter, i.e. the coefficient k, is not set by means of the subtracting unit 408 and the minimization of the residual block. Instead, the adaptive parameter is set in the video decoder 300 preferably depending on signalling data reflecting the value of the coefficient k, said signalling data being part of the encoded video bit stream and being set by the video coder 200.

The sharpening filter 400 comprises a warping based on a displacement vector calculated from the source block, which source block is referred to in FIG. 4 as motion prediction block.

According to an embodiment not shown in FIG. 4, the source block is the reference block of the reference frame stored in the frame buffer 207, 307, such that the displacement vector (wx, wy) is derived from the reference block.

Thereby, the reference block is used as source block for obtaining the displacement vectors, which are also called sharpening displacement vectors or warping displacement vectors. The warping is then applied to the prediction block using the obtained displacement vector. This embodiment is advantageous in that is saves computational resources on the encoder side.

According to the alternative embodiment of FIG. 4, the source block is the prediction block generated by the inter prediction unit 210, 310, such that the displacement vector (wx, wy) is derived from the prediction block.

Thereby, choosing the prediction block as source block allows for the calculation of suitable displacement vectors for carrying out the warping of the prediction block. Also, the sharpening filter then only requires one input for the prediction block and a second input for the reference block is not needed.

Figure 5:
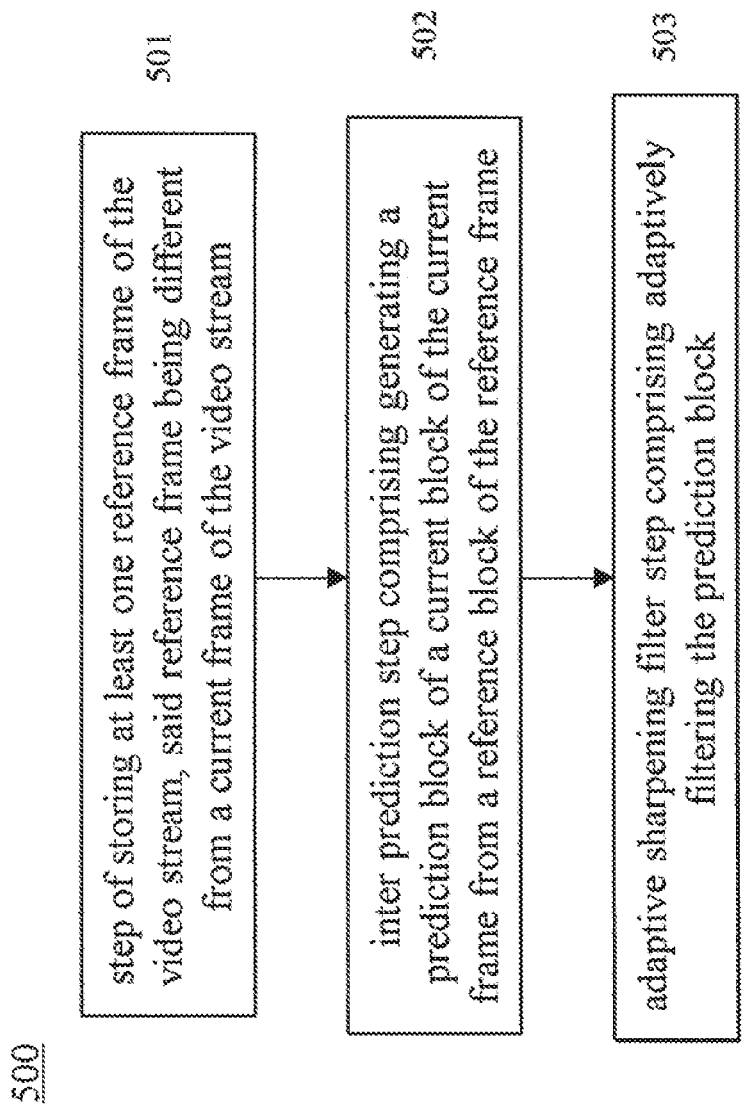
FIG. 5 shows a video coding method according to an embodiment of the present disclosure.

FIG. 5 shows a video coding method according to an embodiment of the present disclosure, and particularly a method 500 for predictive coding a video stream of subsequent frames according to motion compensation into an encoded video bit stream.

The method 500 comprises a step 501 of storing at least one reference frame of the video stream, said reference frame being different from a current frame of the video stream.

The method 500 further on comprises an inter prediction step 502 comprising generating a prediction block of a current block of the current frame from a reference block of the reference frame.

The method 500 further on comprises an adaptive sharpening filter step 503 comprising adaptively filtering the prediction block.

Figure 6:
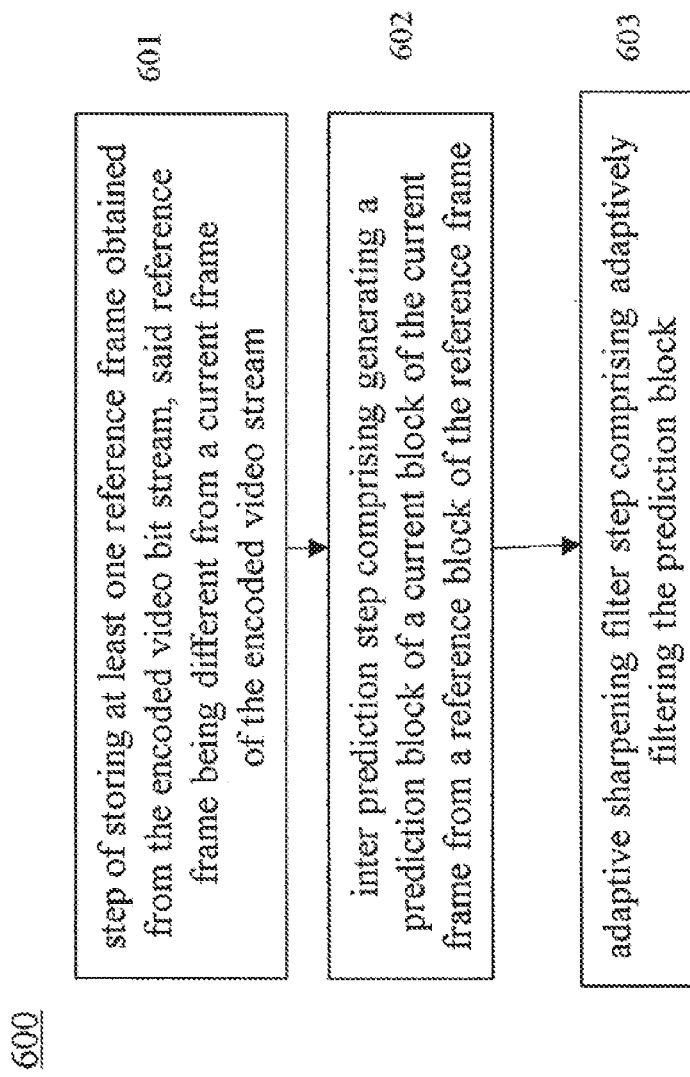
FIG. 6 shows a video decoding method according to an embodiment of the present disclosure.

FIG. 6 shows a video decoding method according to an embodiment of the present disclosure, and particularly a method 600 for decoding an encoded video bit stream obtained by predictive coding a video stream of subsequent frames according to motion compensation.

The method 600 comprises a step 601 of storing at least one reference frame obtained from the encoded video bit stream, said reference frame being different from a current frame of the encoded video bit stream.

The method 600 comprises an inter prediction step 602 comprising generating a prediction block of a current block of the current frame from a reference block of the reference frame.

The method 600 comprises an adaptive sharpening filter step 603 comprising adaptively filtering the prediction block.

Further aspects and features described with respect to the video coder 200 or the video decoder 300 are also applicable to the coding method 500 and the decoding method 600.

Figure 7:
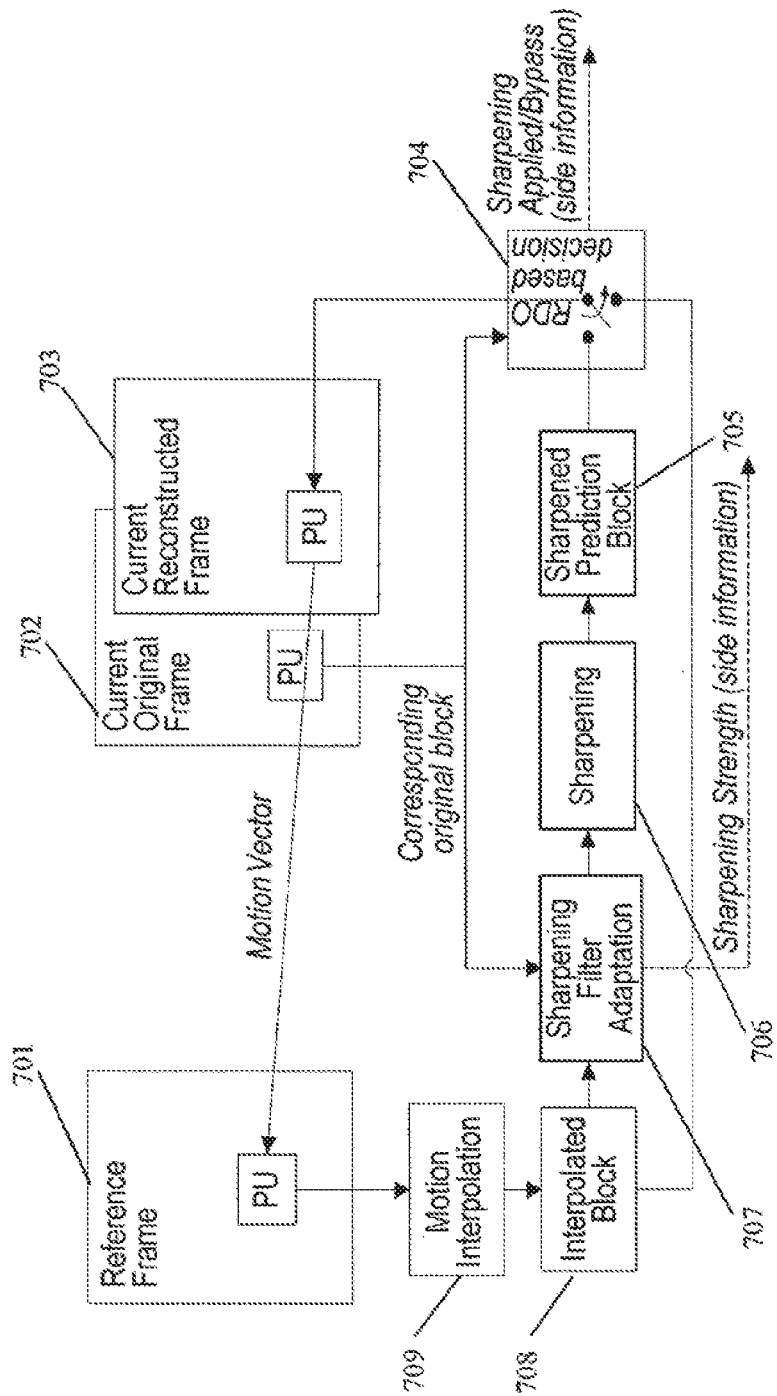
FIG. 7 shows a sharpening adaptation according to an embodiment of the present disclosure.

FIG. 7 shows a sharpening adaptation according to an embodiment of the present disclosure. The sharpening adaptation process shown in FIG. 7 is carried out on the video coder side.

The estimation of the adaptive parameter(s) of the sharpening filter as well as necessity of sharpening itself, i.e. the decision to apply or bypass the adaptive sharpening filter, can be performed together with the motion estimation procedure. FIG. 7 illustrates how the adaptive sharpening parameter(s) can be obtained during the evaluation of motion vector candidates. The following steps can then be performed:

take the motion vector to be analyzed,
obtain motion interpolated block 708 by applying a conventional interpolation filter 709,
perform the sharpening filter adaptation 707 so as to obtain the optimal adaptation parameter(s) for the sharpening filter,
apply the sharpening filter 706 with optimal parameter(s) found in the previous step to obtain sharpened prediction block 705,
decide or evaluate 704 if the sharpened prediction block is better that the prediction block without sharpening, wherein this decision/evaluation is based on a rate-distortion optimization and is transmitted to the video decoder by means of the sharpening filter information added as signalling data or side information to the encoded video bit stream. This sharpening filter information is identified in FIG. 7 as sharpening on/off.

If the video coder 200 decides to apply a sharpened prediction, then also adaptive parameter information reflecting the value of the optimal parameter(s) of the sharpening filter is added as signalling data to the encoded video bit stream. The adaptive parameter information is identified in FIG. 7 as sharpening strength.

The sharpening adaptation shown in FIG. 7 can be applied at different steps of the motion estimation loop. FIG. 8a and FIG. 8b and FIG. 8c show three possible embodiments for integrating the sharpening adaptation process into the motion vector search.

In the embodiment of FIG. 8a, the sharpening adaptation—i.e. finding the optimal coefficient k—is performed for each possible motion vector candidate. This embodiment provides the best possible quality at the cost of searching complexity.

Correspondingly, the motion estimation 800 of FIG. 8a comprises a sharpening filter adaptation 803 for each motion vector candidate 801. For a motion vector candidate, the prediction block is obtained 802, the adaptive sharpening is performed 803 and a decision is taken whether the sharpening filter shall be applied or bypassed 804. This procedure is repeated for each possible motion vector candidate.

In the embodiment of FIG. 8c, the sharpening adaptation is alternatively performed only for one motion vector, i.e. for the best motion vector that is found during the motion estimation. This embodiment is advantageous in that it reduces the search complexity. On the other hand, the found sharpened prediction block may not be the best possible.

Correspondingly, the motion estimation 820 of FIG. 8c comprises only one sharpening adaptation step 825. Based on this sharpening adaptation 825, it can be decided whether the adaptive sharpening filter shall by applied or bypassed 826. Prior to the sharpening adaptation 825, an integer motion vector search 822 is carried out for each motion vector candidate 821, and a fractional motion vector search 824 is carried out for each fractional position 823.

The embodiment shown in FIG. 8b is a balanced solution between the embodiments of FIGS. 8a and 8c: the sharpening adaptation is performed only during the fractional motion vector refinement. In this embodiment, the integer motion vector search is performed without sharpening adaptation to reduce the search complexity.

Correspondingly, the motion estimation 810 of FIG. 8b comprises an integer motion vector search 812 that is carried out for each motion vector candidate 811. Once the integer motion vector search is done 812, the obtained prediction block is interpolated 814 for each fractional position 813: a sharpening adaptation 815 is performed for each prediction block, and it is decided 816 for each prediction block whether the sharpening filter shall be applied or bypassed.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfil the functions of several entities or items recited in the claims. The mere fact that certain measures are recited in the mutual different dependent claims does not indicate that a combination of these measures cannot be used in an advantageous implementation.

Additionally, statements made herein characterizing the disclosure refer to an embodiment of the disclosure and not necessarily all embodiments.

What is claimed is:

1. A video coder for predictive coding according to motion compensation, the video coder comprising:
   a frame buffer, configured to store at least one reference frame of a video stream, the at least one reference frame being different from a current frame of the video stream; and
   computer hardware configured to run a computer program having program code, the program code implementing a plurality of units including a control unit, an inter prediction unit, and an adaptive sharpening filter,
   wherein the inter prediction unit is configured to generate a prediction block of a current block of the current frame from a reference block of the at least one reference frame;
   wherein the adaptive sharpening filter is configured to adaptively filter the prediction block, wherein the adaptive sharpening filter is configured to be controlled by at least one adaptive parameter;
   wherein the control unit is configured to determine a parameter value of the at least one adaptive parameter and supply the determined parameter value to the adaptive sharpening filter;
   wherein the adaptive sharpening filter comprises:
      an edge map calculation unit, configured to generate an edge map of a source block, the source block being the reference block or the prediction block;
      a blurring filter, configured to blur the edge map of the source block;
      a high-pass filter, configured to generate, by high-pass filtering the blurred edge map, a derivative vector for each position of the source block;
      a scaling unit, configured to generate a displacement vector by scaling the derivative vector with a sharpening strength coefficient; and
      a warping unit, configured to warp the prediction block based on the displacement vector; and
   wherein the at least one adaptive parameter includes the sharpening strength coefficient.

2. The video coder according to claim 1, wherein the control unit is configured to supply different parameter values for the at least one adaptive parameter and to select one of the different parameter values based on a minimization of a residual block, the residual block being the difference between the current block and the prediction block, or based on a cost criterion.

3. The video coder according to claim 1, wherein the adaptive sharpening filter is a non-linear filter.

4. The video coder according to claim 1, wherein the computer program having the program code further implements:
   an encoding unit configured to generate an encoded video bit stream;
   wherein the control unit is configured to transmit to the encoding unit adaptive parameter information about the determined parameter value; and
   wherein the encoding unit is configured to add the adaptive parameter information in the encoded video bit stream.

5. The video coder according to claim 1, wherein the adaptive sharpening filter is always enabled.

6. The video coder according to claim 1,
   wherein the control unit is further configured to control a selective bypass of the adaptive sharpening filter and/or a selective application of the adaptive sharpening filter.

7. The video coder according to claim 6, wherein controlling the selective bypass and/or the selective application is based on a minimization of a residual block, the residual block being the difference between the current block and the prediction block, or based on another cost criterion.

8. The video coder according to claim 6, wherein the computer program having the program code further implements:
   an encoding unit configured to generate an encoded video bit stream;
   wherein the control unit is configured to transmit to the encoding unit sharpening filter information reflecting the selective bypass and/or the selective application; and
   wherein the encoding unit is configured to add the sharpening filter information in the encoded video bit stream.

9. The video coder according to claim 4, wherein the adaptive parameter information or the sharpening filter information is added at a block level for each prediction block, for an arbitrary or regular region of the frame, at a frame level, at a group of pictures (GOP) level, at a picture parameter set (PPS) level or at a sequence parameter set (SPS) level.

10. The video coder according to claim 1, wherein the adaptive sharpening filter is configured to be controlled by a single adaptive parameter.

11. A method for predictive coding according to motion compensation, the method comprising:
   storing, by a video coder, at least one reference frame of a video stream, the at least one reference frame being different from a current frame of the video stream;
   generating, by the video coder, a prediction block of a current block of the current frame from a reference block of the at least one reference frame;
   determining, by the video coder, a parameter value of the at least one adaptive parameter; and
   adaptively filtering, by the video coder, the prediction block based on the at least one adaptive parameter, wherein adaptively filtering the prediction block comprises:
      generating an edge map of a source block, the source block being the reference block or the prediction block;
      blurring the edge map of the source block;
      generating, by high-pass filtering the blurred edge map, a derivative vector for each position of the source block;
      generating a displacement vector by scaling the derivative vector with a sharpening strength coefficient; and warping the prediction block based on the displacement vector; and wherein the at least one adaptive parameter includes the sharpening strength coefficient.

12. A video decoder for decoding an encoded video bit stream obtained by predictive coding according to motion compensation, comprising:
 a frame buffer, configured to store at least one reference frame obtained from the encoded video bit stream, the at least one reference frame being different from a current frame of the encoded video bit stream; and
 computer hardware configured to run a computer program having program code, the program code implementing a plurality of units including a control unit, an inter prediction unit, and an adaptive sharpening filter,
 wherein the inter prediction unit is configured to generate a prediction block of a current block of the current frame from a reference block of the at least one reference frame;
 wherein the adaptive sharpening filter is configured to adaptively filter the prediction block, wherein the adaptive sharpening filter is configured to be controlled by at least one adaptive parameter;
 wherein the control unit is configured to determine a parameter value of the at least one adaptive parameter and supply the determined parameter value to the adaptive sharpening filter;
 wherein the adaptive sharpening filter comprises:
  an edge map calculation unit, configured to generate an edge map of a source block, the source block being the reference block or the prediction block;
  a blurring filter, configured to blur the edge map of the source block;
  a high-pass filter, configured to generate, by high-pass filtering the blurred edge map, a derivative vector for each position of the source block;
  a scaling unit, configured to generate a displacement vector by scaling the derivative vector with a sharpening strength coefficient; and
  a warping unit, configured to warp the prediction block based on the displacement vector; and
 wherein the at least one adaptive parameter includes the sharpening strength coefficient.

13. The video decoder according to claim 12, wherein the control unit is configured to determine the parameter value of the at least one adaptive parameter depending on adaptive parameter information obtained from the encoded video bit stream.

14. The video decoder according to claim 12, wherein the control unit is configured to control a selective bypass of the adaptive sharpening filter and/or a selective application of the adaptive sharpening filter.

15. The video decoder according to claim 14, wherein controlling the selective bypass and/or the selective application is based on sharpening filter information obtained from the encoded video bit stream.

16. A method for decoding an encoded video bit stream obtained by predictive coding according to motion compensation, the method comprising:
 storing, by a video decoder, at least one reference frame obtained from the encoded video bit stream, the at least one reference frame being different from a current frame of the encoded video bit stream;
 generating, by the video decoder, a prediction block of a current block of the current frame from a reference block of the reference frame;
 determining, by the video decoder, a parameter value of the at least one adaptive parameter; and
 adaptively filtering, by the video decoder, the prediction block based on the at least one adaptive parameter, wherein adaptively filtering the prediction block comprises:
  generating an edge map of a source block, the source block being the reference block or the prediction block;
  blurring the edge map of the source block;
  generating, by high-pass filtering the blurred edge map, a derivative vector for each position of the source block;
  generating a displacement vector by scaling the derivative vector with a sharpening strength coefficient; and
  warping the prediction block based on the displacement vector; and
 wherein the at least one adaptive parameter includes the sharpening strength coefficient.

* * * * *